(12) United States Patent
Chou et al.

(10) Patent No.: US 10,262,451 B1
(45) Date of Patent: Apr. 16, 2019

(54) VIEW-DEPENDENT COLOR COMPRESSION

(71) Applicant: 8i Limited, Wellington (NZ)

(72) Inventors: Philip A. Chou, Culver City, CA (US);
Xiang Zhang, Culver City, CA (US);
Ming-Ting Sun, Culver City, CA (US);
Ricardo de Queiroz, Culver City, CA (US)

(73) Assignee: 8i Limited, Wellington (NZ)

( * ) Notice: Subject to any disclaimer, the term of this patent is extended or adjusted under 35 U.S.C. 154(b) by 0 days.

(21) Appl. No.: 15/948,655

(22) Filed: Apr. 9, 2018

(51) Int. Cl.
| | |
|---|---|
| *G06T 15/06* | (2011.01) |
| *G06T 15/08* | (2011.01) |
| *G06T 15/20* | (2011.01) |
| *G06T 15/30* | (2011.01) |
| *G06T 15/10* | (2011.01) |
| *G06T 15/04* | (2011.01) |
| *G06T 19/20* | (2011.01) |

(52) U.S. Cl.
CPC ............. *G06T 15/10* (2013.01); *G06T 15/04* (2013.01); *G06T 19/20* (2013.01); *G06T 2207/10028* (2013.01); *G06T 2207/20072* (2013.01)

(58) Field of Classification Search
CPC ......... G06T 15/10; G06T 19/20; G06T 15/04; G06T 2207/10028; G06T 2207/20072; G06T 7/90; G06T 9/00
See application file for complete search history.

(56) References Cited

U.S. PATENT DOCUMENTS

| | | | | | |
|---|---|---|---|---|---|
| 5,629,780 | A | * | 5/1997 | Watson | H04N 19/176 358/539 |
| 6,154,493 | A | * | 11/2000 | Acharya | H04N 1/648 348/398.1 |
| 7,792,370 | B2 | * | 9/2010 | Sun | H04N 19/105 348/272 |

(Continued)

OTHER PUBLICATIONS

"Blender version 2.78c", The Blender Foundation, [Online]. Retrieved from the Internet: <URL: https://www.blender.org/download/releases/2-78/>, (Accessed Apr. 4, 2018), 9 pgs.

(Continued)

*Primary Examiner* — Martin Mushambo
(74) *Attorney, Agent, or Firm* — Schwegman Lundberg & Woessner, P.A.

(57) ABSTRACT

A machine accesses view maps that each corresponds to a different point on a surface of a three-dimensional object. The machine generates vectors of coefficients by calculating a corresponding transform of each view map. The vectors specify a corresponding coefficient for each basis function among a group of basis functions. For each basis function in the group, the machine generates a spatial representation of coefficients specified for that basis function across all of the accessed view maps, and then quantizes the spatial representation of coefficients for that basis function. The quantized spatial representation forms part of a group of quantized spatial representations of coefficients that corresponds to the accessed view maps. The machine then provides the group of quantized spatial representations of coefficients as a compressed version of the view maps. A decoder device can then approximate the view maps based on the group of quantized spatial representations.

20 Claims, 10 Drawing Sheets

(56) References Cited

U.S. PATENT DOCUMENTS

| | | | | |
|---|---|---|---|---|
| 9,516,315 | B2* | 12/2016 | Tan | H04N 19/147 |
| 9,734,595 | B2* | 8/2017 | Lukac | G06T 9/00 |
| 9,819,957 | B2* | 11/2017 | Mody | H04N 19/44 |
| 9,883,184 | B2* | 1/2018 | Rapaka | H04N 19/124 |
| 2002/0172418 | A1* | 11/2002 | Hu | G06T 9/00 |
| | | | | 382/166 |
| 2003/0185439 | A1* | 10/2003 | Malvar | H04N 1/41 |
| | | | | 382/166 |
| 2015/0016501 | A1* | 1/2015 | Guo | G06T 9/00 |
| | | | | 375/240.02 |
| 2015/0043815 | A1* | 2/2015 | Tan | H04N 19/147 |
| | | | | 382/166 |
| 2017/0214943 | A1* | 7/2017 | Cohen | H04N 19/136 |
| 2017/0347122 | A1* | 11/2017 | Chou | H04N 19/60 |

OTHER PUBLICATIONS

"Call for Proposals for Point Cloud Compression V2. ISO/IEC JTC1/SC29/WG11 output document N16763", MPEG 3DG and Requirements Groups, (Apr. 2017), 7 pgs.

"Free 3-D Blender Download", Copyright © Free3D All rights reserved., [Online]. Retrieved from the Internet: <URL: https://free3d.com/>, (Accessed Apr. 4, 2018), 3 pgs.

Adelson, E, et al., "The Plenoptic Function and the Elements of Early Vision", Computational Models of Visual Processing, (1991), 3-20.

Bossen, Frank, et al., "Joint Video Team (JVT) Reference Software", Joint Collaborative Team on Video Coding (JCT-VC) of ITU-T SG16 WP3 and ISO/IEC JTC1/SC29/WG11, [Online]. Retrieved from the Internet: <URL: https://hevc.hhi.fraunhofer.de/svn/svn_HEVCSoftware/tags/HM-16.2/doc/software-manual.pdf>, (2014), 28 pgs.

Chen, Jie, et al., "Light Field Compression with Disparity Guided Sparse Coding based on Structural Key Views", IEEE Trans. Image Process., (2017), 27 pgs.

Chen, Wei-Chao, et al., "Light Field Mapping: Efficient Representation and Hardware Rendering of Surface Light Fields", Trans. Graphics (TOG), ACM, 21(3), (2002), 447-456.

Conti, Caroline, et al., "HEVC-Based Light Field Image Coding With Bi-Predicted Self-Similarity Compensation", IEEE Int. Conf. Multimedia & Expo Workshops (ICMEW), (2016), 4 pgs.

De Queiroz, R L, et al., "Compression of 3D Point Clouds Using a Region-Adaptive Hierarchical Transform", IEEE Transactions on Image Processing, vol. 25, No. 8, Aug. 2016, (Aug. 2016), 3947-3956.

Georgiev, Todor, et al., "Spatio-Angular Resolution Tradeoff in Integral Photography", Proceedings of the 17th Eurographics Conference on Rendering Techniques (EGSR), (2006), 263-272.

Georgiev, Todor, et al., "The Radon Image as Plenoptic Function", 2014 IEEE International Conference on Image Processing (ICIP), (2014), 1922-1926.

Hua, Binh-Son, et al., "Scenenn: A scene meshes dataset with annotations", International Conference on 3D Vision (3DV), [Online]. Retrieved from the Internet: <URL: http://people.sutd.edu.sg/~saikit/projects/sceneNN/>, (2016), 6 pgs.

Huang, Y, et al., "A generic scheme for progressive point cloud coding", IEEE Trans. Vis. Comput. Graphics, vol. 14, No. 2, (Mar. 2008), 440-453.

Jia, C, et al., "Light Field Image Compression with with Sub-apertures Reordering and Adaptive Reconstruction", Pacific-Rim Conference on Multimedia (PCM), (2017), 1-9.

Jia, C., et al., "Optimized Inter-View Prediction Based Light Field Image Compression With Adaptive Reconstruction", IEEE Int. Conf. Image Processing (ICIP), (2017), 5 pgs.

Jiang, Xiaoran, et al., "Light Field Compression with Homography-based Low Rank Approximation", IEEE Journal of Selected Topics in Signal Processing., (2017), 1-14.

Kammerl, N., et al., "Real-time compression of point cloud streams", IEEE International Conference on Robotics and Automation, (May 2002), 778-785.

Levoy, Marc, et al., "Light Field Rendering", Proc. ACM SIGGRAPH (with corrections, Jul. 1996), (1996), 12 pgs.

Li, L, et al., "Pseudo-Sequence-Based 2-D Hierarchical Coding Structure for Light-Field Image Compression", IEEE Journal of Selected Topics in Signal Processing, vol. 11, No. 7., (2017), 1107-1119.

Li, Yun, et al., "Coding of focused plenoptic contents by displacement intra prediction", IEEE Trans. Circuits Syst. Video Technol., vol. 26, No. 7, (2016), 1308-1319.

Li, Yun, et al., "Compression of Unfocused Plenoptic Images Using a Displacement Intra Prediction", IEEE Int. Conf. Multimedia & Expo Workshops (ICMEW), (2016), 1-4.

Li, Yun, et al., "Efficient intra prediction scheme for light field image compression", in IEEE Int. Conf. Acoustics, Speech and Signal Processing (ICASSP)., (2014), 539-543.

Li, Yun, et al., "Scalable Coding of Plenoptic Images by Using a Sparse Set and Disparities", IEEE Transactions on Image Processing, vol. 25, No. 1, (Jan. 2016), 12 pgs.

Liu, Dong, et al., "Pseudo-Sequence-Based Light Field Image Compression", IEEE Int. Conf. Multimedia & Expo Workshops (ICMEW), (Jul. 2016), 4 pgs.

Magnor, M., et al., "Data compression for light-field rendering", IEEE Trans. Circuits Syst. Video Technol., vol. 10, No. 3, (2000), 338-343.

Miller, Gavin, et al., "Lazy decompression of surface light fields for precomputed global illumination", Rendering Techniques, Springer, (1998), 12 pgs.

Monteiro, Ricardo, et al., "Light field HEVC-based image coding using locally linear embedding and self-similarity compensated prediction", IEEE, (2015), 4 pgs.

Ng, Ren, et al., "Light field photography with a Hand-held Plenoptic Camera", Computer Science Technical Report CSTR, vol. 2, No. 11, (2005), 1-11.

Ochotta, Tilo, et al., "Compression of Point-Based 3D Models by Shape-Adaptive Wavelet Coding of Multi-Height Fields", Eurographics Symposium on Point-Based Graphics, (2004), 103-112.

Orts-Escolano, S., "Holoportation: Virtual 3d teleportation in realtime", Proceedings of the 29th Annual Symposium on User Interface Software and Technology (UIST), (2016), 741-754.

Perra, C., et al., "An analysis of 3d point cloud reconstruction from light field images", 2016 Sixth International Conference on Image Processing Theory, Tools and Applications (IPTA), (Dec. 2016), 6 pgs.

Phong, B, "Illumination for Computer Generated Pictures", Communications of the ACM, vol. 18, No. 6., (Jun. 1975), 311-317.

Pujol-Miro, Alba, et al., "Registration of Images to Unorganized 3D Point Clouds Using Contour Cues", 25th European Signal Processing Conference (EUSIPCO), (2017), 81-85.

Sabater, Neus, et al., "Accurate Disparity Estimation for Plenoptic Images", Cham: Springer International Publishing, (2015), 548-560.

Schnabel, Ruwen, et al., "Octree-based Point-Cloud Compression", Eurographics Symposium on Point-Based Graphics, (Jul. 2006), 111-121.

Sullivan, Gary, et al., "Overview of the High Ef?ciency Video Coding (HEVC) Standard", EEE Transactions on Circuits and Systems for Video Technology, vol. 22, No. 12., (Dec. 2012), 1649-1668.

Thanou, Dorina, et al., "Graph-based Motion Estimation and Compensation for Dynamic 3D Point Cloud Compression", IEEE International Conference on Image Processing (ICIP), (2015), 3235-3239.

Vagharshakyan, S, et al., "Light Field Reconstruction Using Shearlet Tansform", EEE Trans. Pattern Anal. Mach. Intell., (2017), 16 pgs.

Wood, Daniel, et al., "Surface Light Fields for 3D Photography", Proceedings of the 27th annual conference on Computer graphics and interactive techniques, ACM., (2000), 287-296.

Zhang, C, et al., "Point cloud attribute compression with graph transform", IEE International Conference Image Processing, (Oct. 2014), 2066-2070.

(56) References Cited

OTHER PUBLICATIONS

Zhao, Shengyang, et al., "Light field image coding with hybrid scan order", Visual Communications and Image Processing (VCIP)., (2016), 1-4.

* cited by examiner

VIEW-DEPENDENT COLOR COMPRESSION

TECHNICAL FIELD

The subject matter disclosed herein generally relates to the technical field of special-purpose machines that facilitate computer graphics, including software-configured computerized variants of such special-purpose machines and improvements to such variants, and to the technologies by which such special-purpose machines become improved compared to other special-purpose machines that facilitate computer graphics. Specifically, the present disclosure addresses systems and methods to facilitate view-dependent color compression.

BACKGROUND

In virtual reality or augmented reality applications, it is often helpful to be able to render a scene from arbitrary points of view, allowing free-viewpoint navigation for example. While conventional computer graphics allow synthesis of modeled scenes from arbitrary points of view, the photorealism of natural scenes using models is elusive, at least without extreme computation, especially in the presence of complex material and lighting phenomena such as reflection, refraction, and scattering. Light fields aim to provide photo-realistic renderings of three-dimensional (3D) scenes from a range of viewpoints, even in the presence of such complex material and lighting phenomena, to enable rich and immersive viewing experiences.

A light field is a set of rays passing through space (e.g., passing through a point in space), each ray bearing a color, which may be specified by a set of color components (e.g., tristimulus color components, such as triple of red, green, and blue values). If all rays passing through a 3D space are known, it is possible to synthesize an image as if it were taken from a camera at an arbitrary viewpoint. A surface light field is a function representing a light field of rays passing through multiple points on the 3D surface of a 3D object. For each point on the surface, the surface light field around that point, as a function of viewing direction (e.g., expressed in spherical coordinates, such as, azimuth and elevation) can be represented by a corresponding "view map," which may take the example form of a spherical image or other data structure that correlates a set of directions (e.g., viewing directions) with respectively corresponding associated colors.

Thus, the 3D surface of the 3D object can be represented by a set of points (e.g., a point cloud) that each have a corresponding view map. As used herein, a "view map" for a given point is a set of viewing directions and their associated attribute values (e.g., colors) which collectively specify how the point appears when seen from those viewing directions. A set of view maps corresponding to multiple points across the 3D surface can be used to render the 3D surface from any viewing direction. Accordingly, to communicate a representation of the surface light field of the 3D object, a first machine may be configured to provide a second machine with the set of points and the set of view maps, and the second machine may be configured to receive this information and render 3D object based thereon.

BRIEF DESCRIPTION OF THE DRAWINGS

Some embodiments are illustrated by way of example and not limitation in the figures of the accompanying drawings.

DETAILED DESCRIPTION

Figure 1:
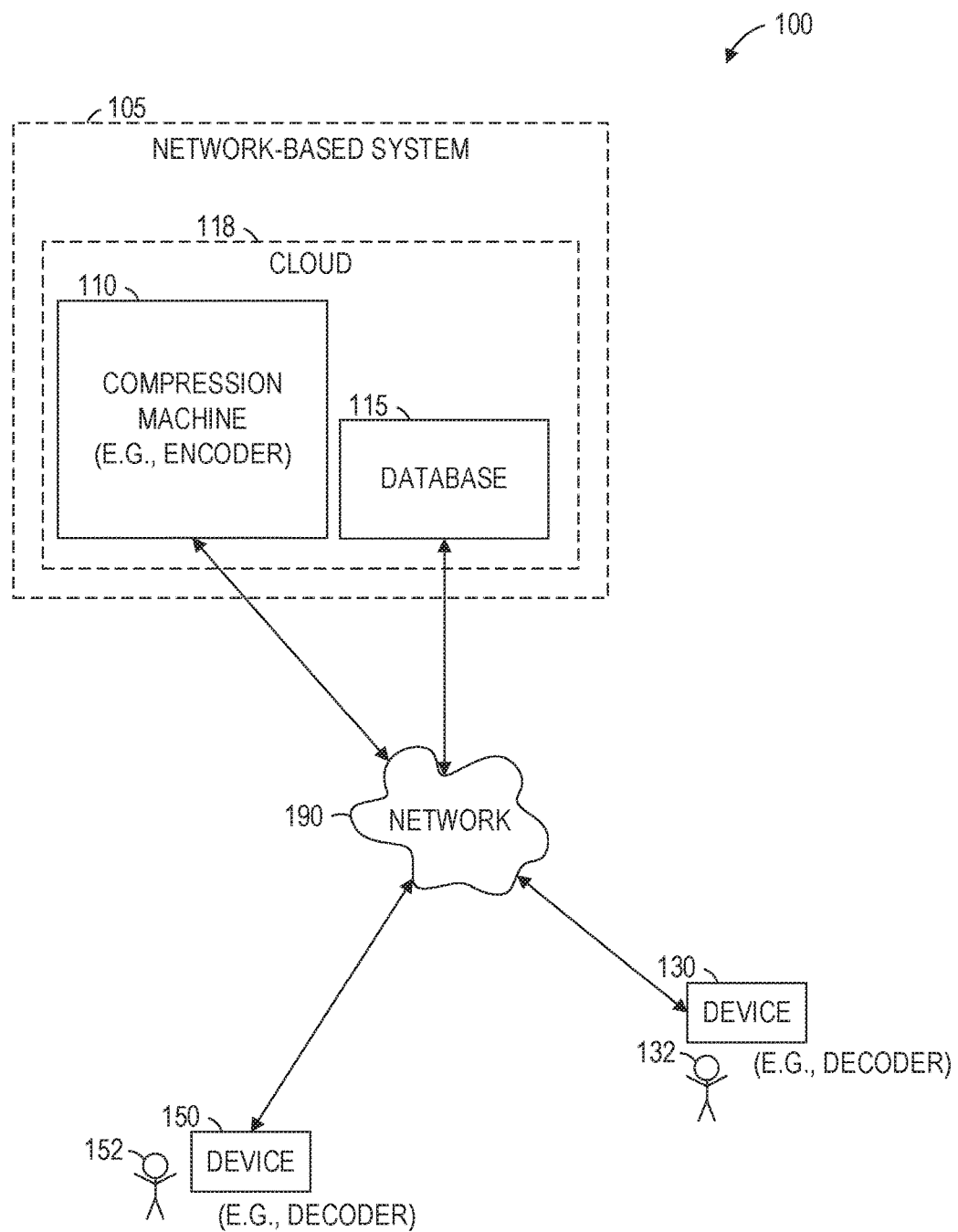
FIG. 1 is a network diagram illustrating a network environment suitable for view-dependent color compression, according to some example embodiments.

Example methods (e.g., algorithms) facilitate view-dependent color compression, and example systems (e.g., special-purpose machines configured by special-purpose software) are configured to facilitate view-dependent color compression. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

As an example, to compress view-dependent color information, a machine (e.g., an encoder machine or compressor machine) is configured (e.g., by special software described herein) to access a set of view maps that each corresponds to a different surface point on a surface of a 3D object. The set of view maps collectively represent the surface light field of the 3D object in the sense that the view maps encode or otherwise specify the surface light field of the 3D object. For each view map in the set, the machine generates a corresponding vector of transform coefficients by calculating a transform of the view map. The generated vector specifies a separate transform coefficient for each transform basis function among a group of transform basis functions represented in the transform of the view map. For each transform basis function in the group, the machine performs at least the following two operations: first, the machine generates a spatial representation of transform coefficients specified for that transform basis function by the generated vectors of transform coefficients of all view maps in the set that represents the surface light field of the 3D object; and then the machine quantizes the generated spatial representation of transform coefficients for that transform basis function. The quantized spatial representation forms part of a group of quantized spatial representations of transform coefficients that corresponds to the accessed set of view maps. The machine then provides the group of quantized spatial representations of transform coefficients (e.g., as a view-dependent, data-compressed version of the set of view maps).

As a converse example, to decompress view-dependent color information, a machine (e.g., a decoder device or decompressor device) is configured (e.g., by special software described herein) to access a group of quantized spatial representations of transform coefficients. As noted above, the group corresponds to a set of view maps that each corresponds to a different surface point on the surface of the 3D object, and the set of view maps represent a surface light field of the 3D object. For each quantized spatial representation in the group, the machine generates approximations of transform coefficients for a corresponding transform basis function among a group of transform basis functions represented in a transform of a corresponding view map among the set of view maps. The generated approximations specify transform coefficients for that transform basis function in vectors of transform coefficients resultant from transforms of all view maps in the set. The machine then generates an approximate version of the set of view maps to represent the surface light field of the 3D object, the approximate version being generated based on the approximations of transform coefficients generated for each quantized spatial representation in the group. Further details are discussed below.

FIG. 1 is a network diagram illustrating a network environment 100 suitable for view-dependent color compression, according to some example embodiments. The network environment 100 includes a compression machine 110, a database 115, and devices 130 and 150 (e.g., decoder devices), all communicatively coupled to each other via a network 190. The compression machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The compression machine 110, the database 115, and the devices 130 and 150 may each be implemented in a special-purpose (e.g., specialized) computer system, in whole or in part, as described below with respect to FIG. 10.

In the network environment 100, the compression machine 110 may provide a data-compressed version of a set of view maps for 3D object, along with geometry information (e.g., point cloud data) for that 3D object, to one or more of the devices 130 and 150. Accordingly, one or more of the device 130 and 150 may decompress the provided version of the set of view maps and render the 3D object based on the decompressed set of view maps.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
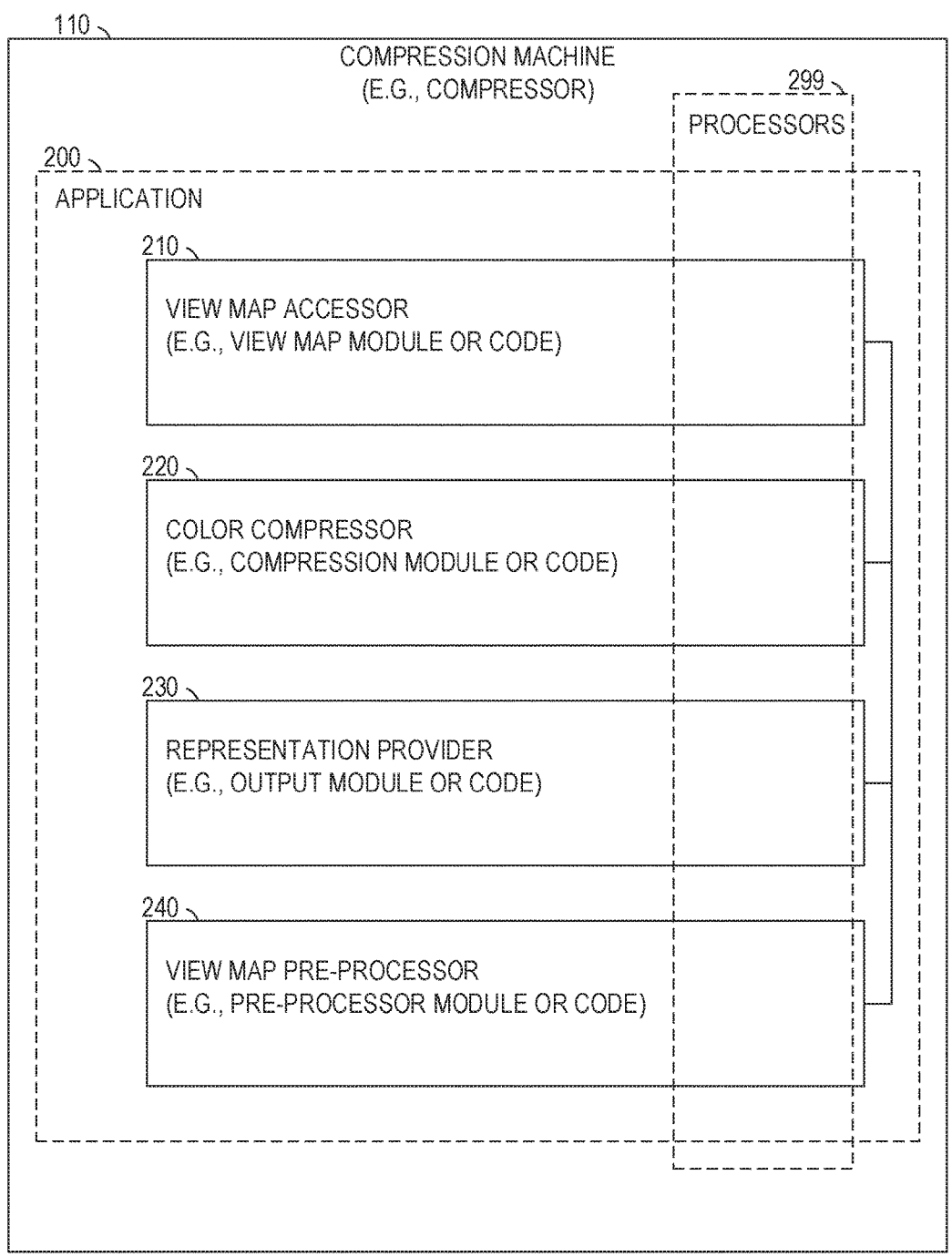
FIG. 2 is a block diagram illustrating components of a compression machine suitable for view-dependent color compression, according to some example embodiments.

FIG. 2 is a block diagram illustrating components of the compression machine 110, as configured to perform view-dependent color compression, according to some example embodiments. The compression machine 110 is shown as including a view map accessor 210, a color compressor 220, a representation provider 230, and a view map pre-processor 240, all configured to communicate with each other (e.g., via a bus, shared memory, or a switch). The view map accessor 210 may be or include a view map module or similarly suitable software code (e.g., configured to access one or more view maps). The color compressor 220 may be or include a compression module or similarly suitable software code (e.g., configured to perform one or more of the compression methodologies discussed herein). The representation provider 230 may be or include an output module or similarly suitable software code (e.g., configured to provide spatial representations of transform coefficients). The view map pre-processor 240 may be or include a pre-processor module or similarly suitable software code (e.g., configured a pre-process one or more view maps accessed by the view map accessor 210).

As shown in FIG. 2, the view map accessor 210, the color compressor 220, the representation provider 230, the view map pre-processor 240, or any suitable combination thereof may form all or part of an application 200 (e.g., a server-side application or a mobile app) that is stored (e.g., installed) on the compression machine 110. Furthermore, one or more processors 299 (e.g., hardware processors, digital processors, or any suitable combination thereof) may be included (e.g., temporarily or permanently) in the application 200, the view map accessor 210, the color compressor 220, the representation provider 230, the view map pre-processor 240, or any suitable combination thereof.

Figure 3:
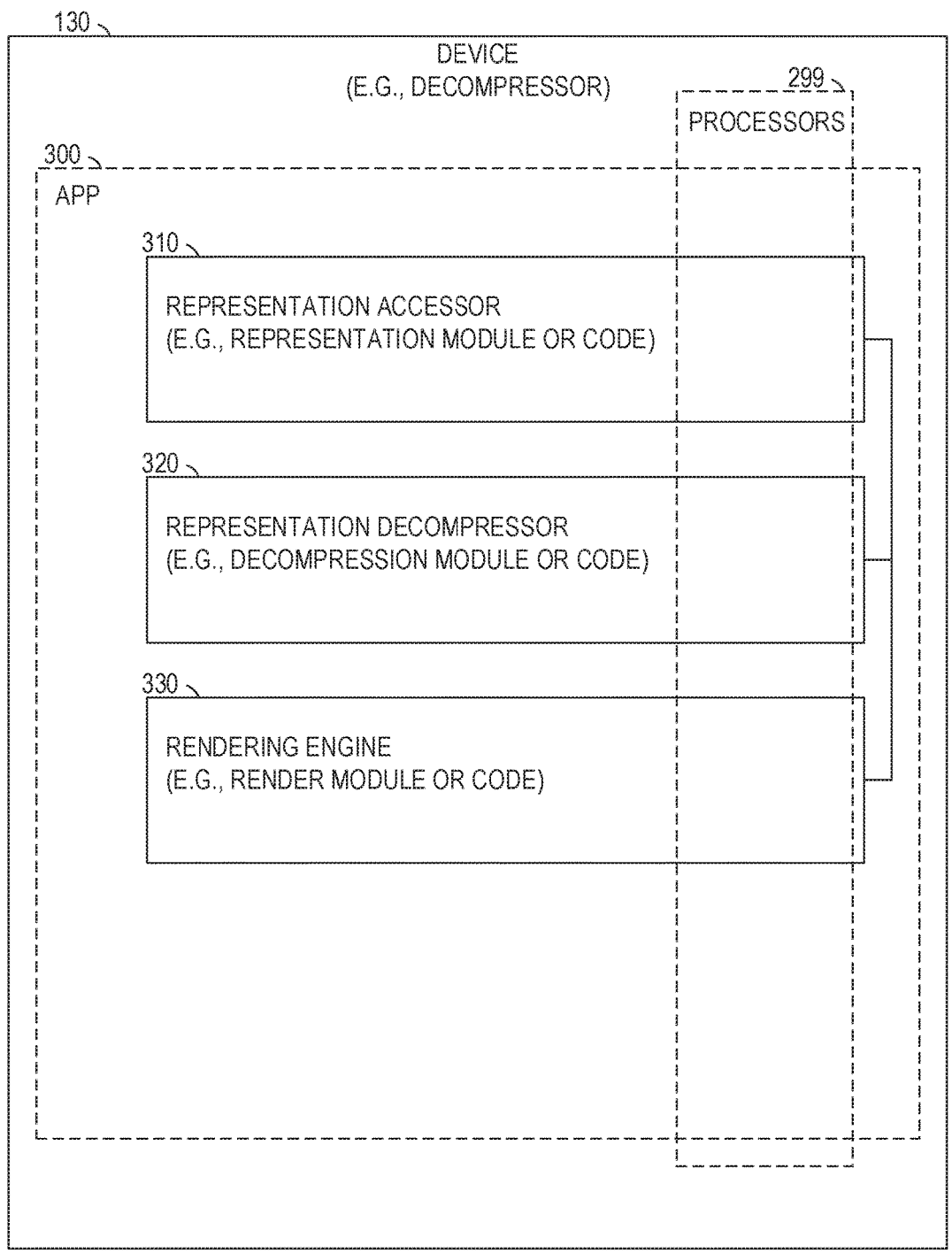
FIG. 3 is a block diagram illustrating components of a device suitable for view-dependent color decompression, according to some example embodiments.

FIG. 3 is a block diagram illustrating components of the device 130, as configured to perform view-dependent color decompression, according to some example embodiments. The device 130 is shown as including a representation accessor 310, a representation decompressor 320, and a rendering engine 330, all configured to communicate with each other (e.g., via a bus, shared memory, or a switch).

The representation accessor 310 may be or include a representation module or similarly suitable software code (e.g., configured to receive or otherwise access compressed view maps in the form of spatial representations of transform coefficients). The representation decompressor 320 may be or include a decompression module or similarly suitable software code (e.g., configured to decompress spatial representations of transform coefficients). The rendering engine 330 may be or include a render module or similarly suitable software code (e.g., configured to render decompressed view maps or otherwise cause decompressed view maps to be rendered).

As shown in FIG. 3, the representation accessor 310, the representation decompressor 320, the rendering engine 330, or any suitable combination thereof may form all or part of an app 300 (e.g., a client-side application or a mobile app) that is stored (e.g., installed) on the device 130. Furthermore, one or more processors 299 (e.g., hardware processors, digital processors, or any suitable combination thereof) may be included (e.g., temporarily or permanently) in the app 300, the representation accessor 310, the representation decompressor 320, the rendering engine 330, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
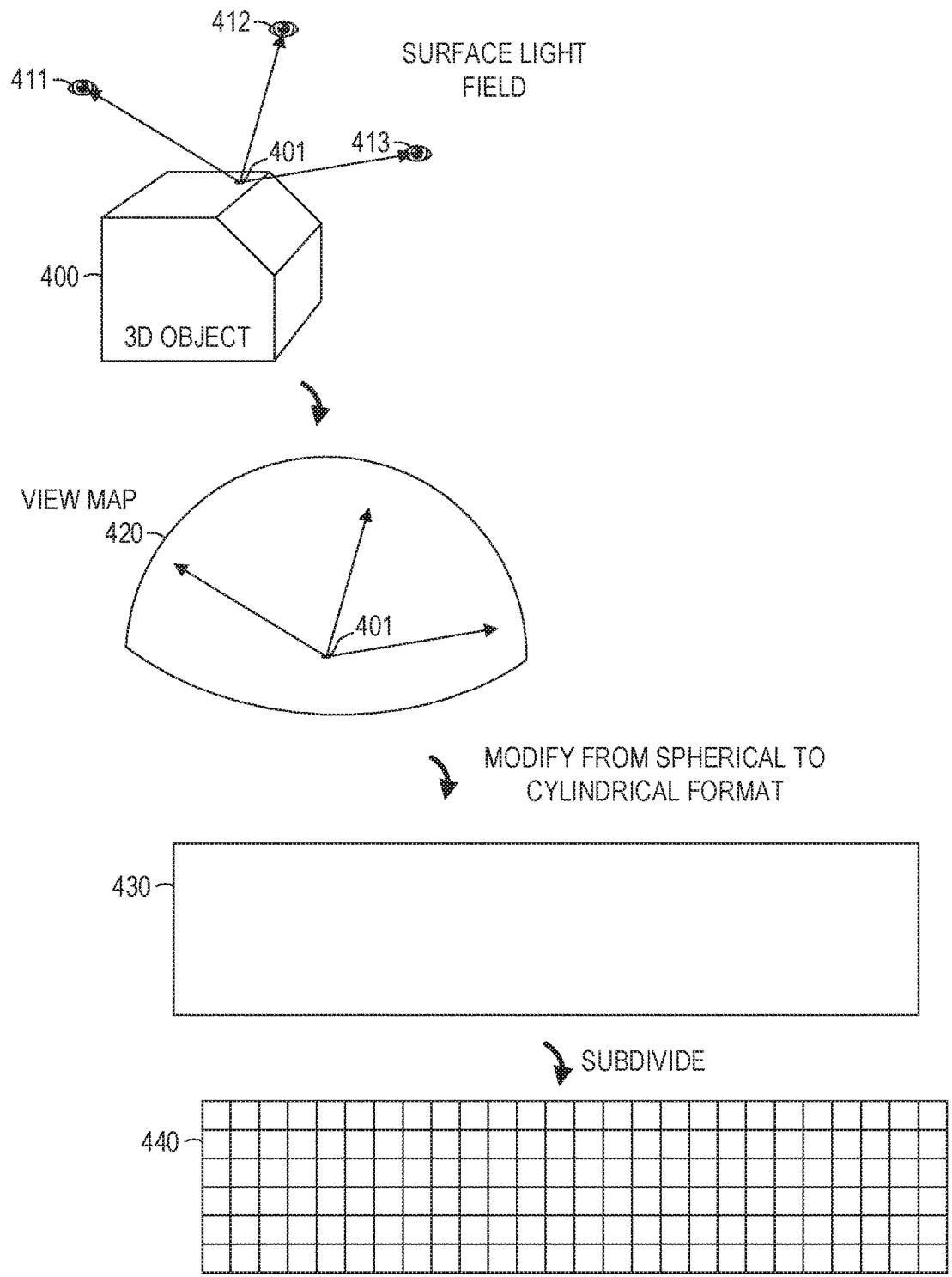
FIG. 4 and FIG. 5 are diagrams illustrating an overview of view-dependent color compression, according to some example embodiments.
Figure 5:
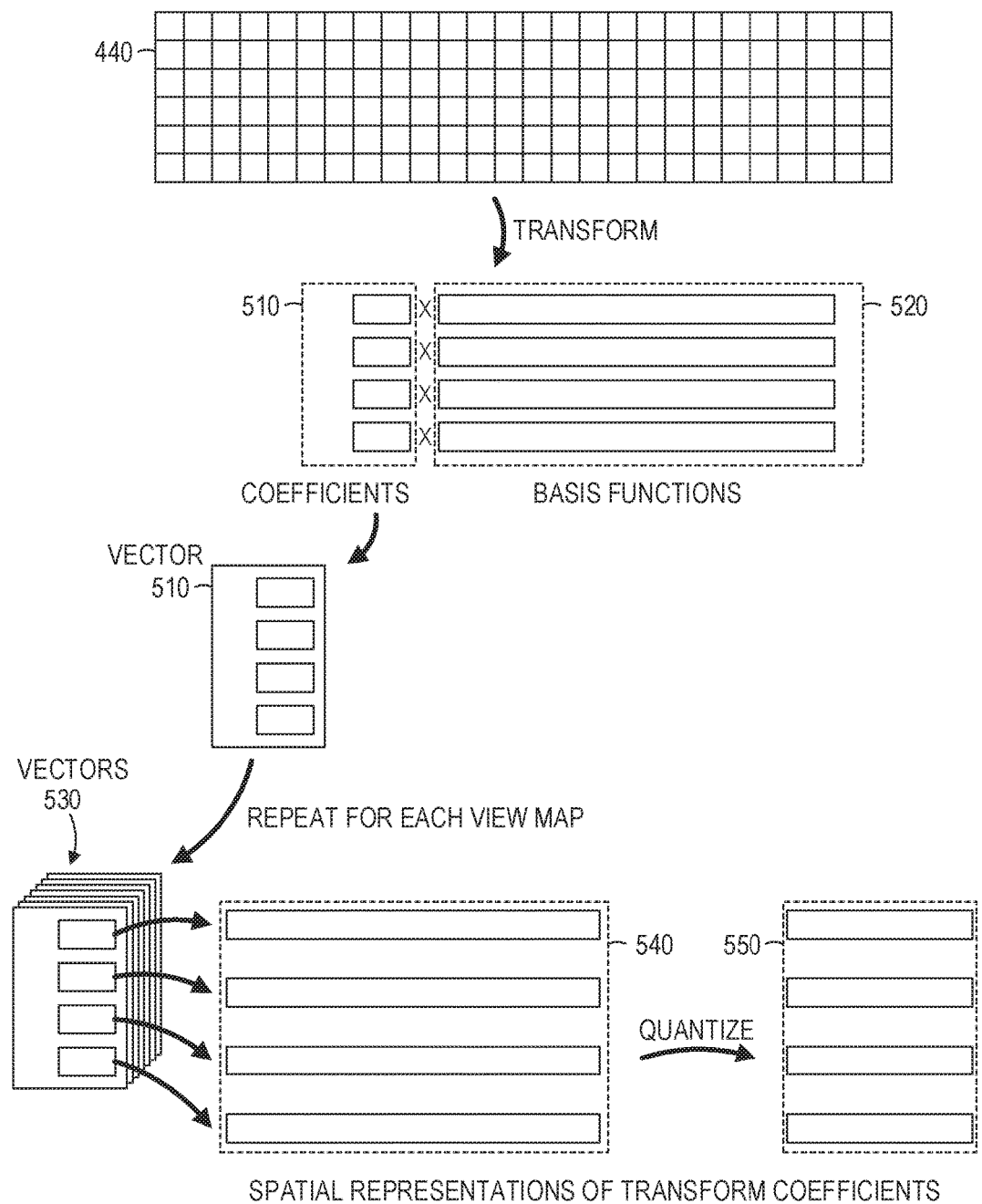

FIG. 4 and FIG. 5 are diagrams illustrating an overview of view-dependent color compression, according to some example embodiments. As shown in FIG. 4, a 3D object 400 is to be viewed and therefore rendered from any arbitrary point of view. For clarity and brevity, three example points of view 411, 412, and 413 are represented by eyeball icons, and the points of view 411, 412, and 413 each have a respectively corresponding location relative to the 3D object 400.

In some example embodiments, the points of view 411, 412, and 413 respectively correspond to physical cameras that observe a physical object from different physical viewing locations and record colors of points on the physical object as seen therefrom. In such example embodiments, the physical cameras capture rays of a physical light field, which will later be used to generate other rays of a virtual light field during a rendering of some or all of the 3D object 400. In certain example embodiments, the points of view 411, 412, and 413 respectively correspond to virtual cameras that observe a virtual object from different virtual viewing locations and record colors of points on the virtual object as seen therefrom. In such example embodiments, the virtual cameras identify or otherwise determine (e.g., via ray tracing or other algorithmic procedure) rays of a virtual light field, which will later be used to generate other rays of a virtual light field during a rendering of some or all of the 3D object 400.

Accordingly, a point 401 on the surface of the 3D object 400 can be viewed and rendered from any arbitrary point of view (e.g., points of view 411, 412, and 413). As noted above, the color of the point 401 generally may be different when seen from each point of view 411, 412, and 413, as represented by rays from the point 401 to each of the points of view 411, 412, and 413.

As also shown in FIG. 4, the surface light field around the point 401 is represented by a corresponding view map 420 in the example form of a spherical image. As noted above, each point (e.g., the point 401) on the surface of the 3D object 400 has a corresponding view map that represents the surface light field around that point as a function of viewing direction, which may be expressed in spherical coordinates, such as azimuth angle and elevation angle. In certain example embodiments, the view map 420 is a data structure that maps a discrete set of view directions with corresponding associated colors. Within this data structure, one or more view directions may be labeled by coordinates (e.g., spherical coordinates or cylindrical coordinates), an index (e.g., a camera index), or any suitable combination thereof.

As further shown in FIG. 4, the view map 420 of the point 401 can be modified by converting it from a spherical image format to a cylindrical image format, thus producing a cylindrical image 430. In some example embodiments, this process includes re-parameterizing the elevation coordinates (e.g., as vertical coordinates) by calculating the trigonometric sine of the elevation coordinates. This may have the effect of ensuring that equal areas in the view map 420, which is spherical, are represented as equal areas in the cylindrical image 430, which is planar. This in turn ensures that any orthogonal features in the spherical view map 420 continue to be orthogonal in the planar cylindrical image 430.

As additionally shown in FIG. 4, the cylindrical image 430 may then be subdivided into subregions within a subdivided image 440. In some example embodiments, the subregions all have equal areas. Separately, in various example embodiments, the number of subregions may define a level of precision in which points of view (e.g., the points of view 411, 412, and 413, which may correspond to camera positions) are represented in the subdivided image 440. In some cases, each subdivision has a corresponding color (e.g., to indicate that color information is available for that corresponding point of view) or is empty (e.g., to indicate that no color information is available for that corresponding point of view). Accordingly, in some variants of the illustrated subdivided image 440, each of its subregions indicates either presence (e.g., existence of information, such as color information) or absence (e.g., lack of information, such as lack of color information) of a corresponding indicator of the surface light field of the 3D object 400.

As shown in FIG. 5, the subdivided image 440 may be used as input to calculate a mathematical transform of the subdivided image 440. That is, a mathematical transform (e.g., a B-spline wavelet transform or other transform) of the subdivided image 440 can be calculated, and the resulting vector 510 of transform coefficients specifies degrees to which corresponding transform basis functions 520 are represented in the calculated transform. In some example embodiments, the mathematical transform is calculated directly based on the cylindrical image 430 (e.g., without subdividing the cylindrical image 430 to obtain the subdivided image 440). In certain example embodiments, the mathematical transform is calculated directly based on the spherical view map 420 (e.g., without conversion to cylindrical format).

In alternative example embodiments, the view map 420 is or includes a data structure that correlates a discrete set of view directions with their associated colors. In such example embodiments, if the view directions are labeled by coordinates (e.g., azimuth and elevation), then vector 510 of transform coefficients may be determined as the coefficients of continuous transform basis functions 520, such as the basis functions of a continuous B-spline basis, fit to the colors at those coordinates. In situations where the view directions are labeled by indices (e.g., within a camera index), then the vector 510 of transform coefficients may be determined as the coefficients of discrete basis vectors, instead of the illustrated transform basis functions 520, fit to the colors at those indices. Examples of such basis vectors include the basis vectors of a Karhunen-Loève transform or other discrete transform.

As also shown in FIG. 5, the vector 510 of transform coefficients can be extracted from the calculated mathematical transform of the subdivided image 440 and used to represent the view map 420 of the point 401 on the surface of the 3D object 400. Alternatively, the vector 510 of transform coefficients can be obtained as the coefficients of basis functions (e.g., the transform basis functions 520) obtained by fitting the basis functions to the colors associated with a discrete set of view directions forming the view map 420. A similar corresponding vector of transform coefficients can be obtained in a similar manner to represent each view map of each point on the surface of the 3D object 400. Each vector of transform coefficients specifies a separate corresponding transform coefficient for each transform basis function among the transform basis functions 520 represented in the mathematical transform of the subdivided image 440.

Thus, the vector 510 of transform coefficients can be added to an aggregated group of vectors 530 of transform coefficients from all view maps that represent the surface light field around the 3D object 400. If the same mathematical transform is used for all of the view maps (e.g., the view map 420), the transform basis functions 520 are the same across all of the view maps, and information sufficient to identify the transform basis functions 520 accordingly can be separately communicated to a decoding device (e.g., the device 130) or assumed at the decoding device (e.g., hard-coded into the app 300).

As further shown in FIG. 5, after repeating the above-described process for each view map (e.g., for each point on the surface of the 3D object 400), the vectors 530 of transform coefficients represent the surface light field across multiple points on the surface of the 3D object 400. Thus, the vectors 530 of transform coefficients can be data-compressed by removing spatial redundancy across these points (e.g., across their corresponding view maps). For example, each of the vectors 530 of transform coefficients specifies a corresponding first transform coefficient such that these specified instances (e.g., values) of the first transform coefficient all weight the same transform basis function (e.g., a first transform basis function), and a spatial representation of these instances of the first transform coefficient can be generated to indicate how the first transform coefficient varies across the multiple points on the surface of the 3D object 400. Likewise, each of the vectors 530 of transform coefficients specifies a corresponding second transform coefficient such that all these specified instances (e.g., values) of the second transform coefficient all weight the same transform basis function (e.g., a second transform basis function), and a spatial representation of these instances of the second transfer coefficient can be generated to indicate how the second transform coefficient varies across the multiple points on the surface of the 3D object 400. A similar process can be applied to each transform coefficient (e.g., a third transform coefficient, fourth transform coefficient, and so on) represented in the vectors 530 of transform coefficients. Accordingly, each transform coefficient represented in the vectors 530 of transform coefficients can have its corresponding spatial representation added to a group 540 of spatial representations of the transform coefficients.

As yet further shown in FIG. 5, the group 540 of spatial representations can be data-compressed by being quantized, which results in a quantized group 550 of spatial representations of the transform coefficients. This quantized group 550 of spatial representations can be considered a data-compressed version of the view maps that represent the surface light field around the 3D object 400. Accordingly, the quantized group 550 of spatial representations can be provided to a decoder device (e.g., the device 130), decompressed thereon, and used to render the 3D object 400 from any arbitrary viewing direction.

Figure 6:
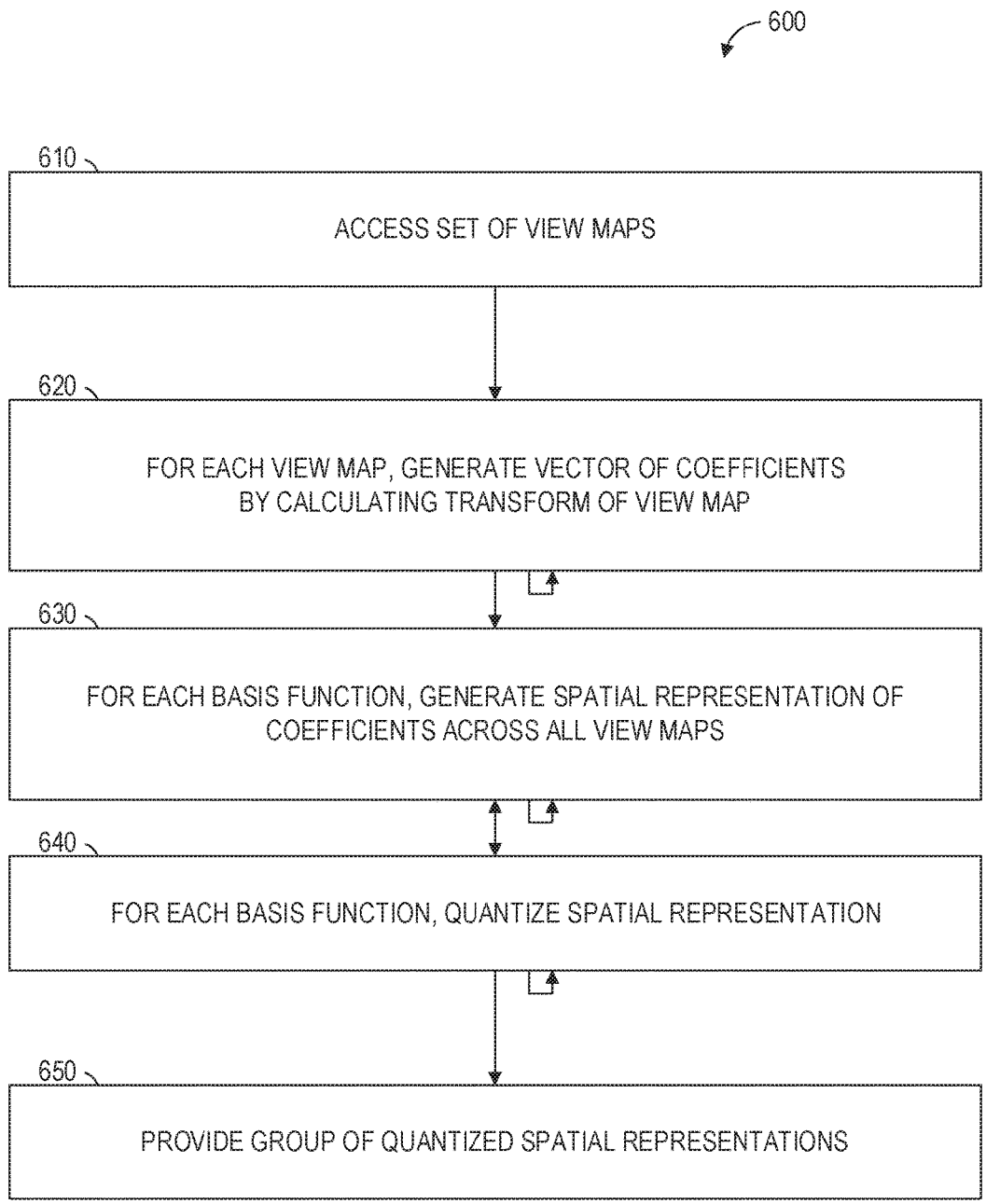
FIG. 6 and FIG. 7 are flowcharts illustrating operations of the compression machine in performing a method of view-dependent color compression, according to some example embodiments.
Figure 7:
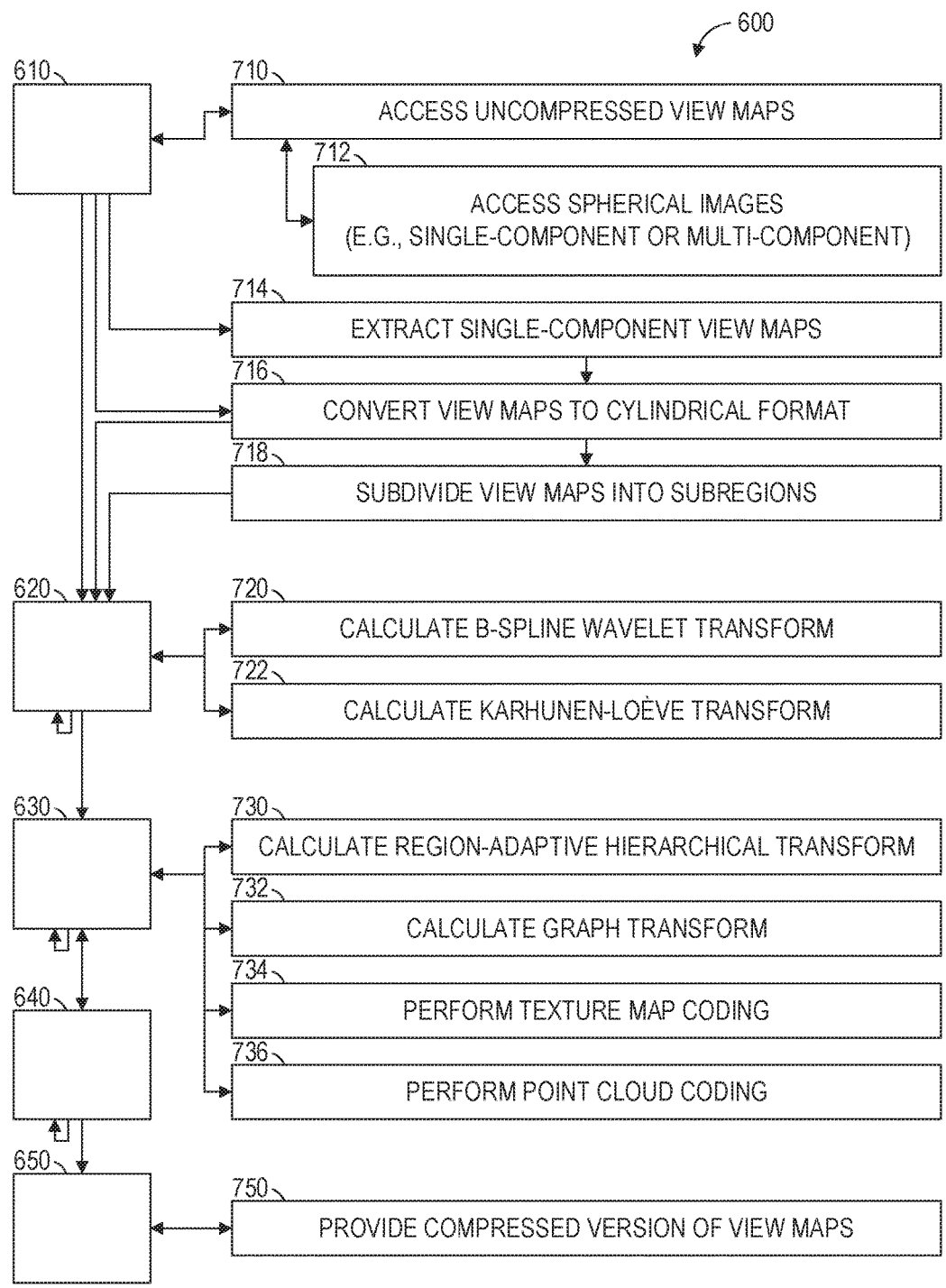

FIG. 6 and FIG. 7 are flowcharts illustrating operations of the compression machine 110 in performing a method 600 of view-dependent color compression, according to some example embodiments. In some example embodiments, the method 600 is fully or partially performed by a device (e.g., the device 130 or the device 150). Operations in the method 600 may be performed using components (e.g., modules) described above with respect to FIG. 2, using one or more processors (e.g., microprocessors or other hardware processors), or using any suitable combination thereof. As shown in FIG. 6, the method 600 includes operations 610, 620, 630, 640, and 650.

In operation 610, the view map accessor 210 accesses a set of view maps that represent the surface light field of the 3D object 400. As noted above, each view map (e.g., the view map 420) corresponds to a different point (e.g., the point 401) on the surface of the 3D object 400. Moreover, when accessed in operation 610, the set of view maps may be in spherical format (e.g., like the view map 420) or cylindrical format (e.g., like the cylindrical image 430), subdivided into subregions (e.g., like the subdivided image 440), specify a set of discrete new directions and correlate the view directions with corresponding colors, or any suitable combination thereof. In some example embodiments, the accessing of the set of view maps is performed by generating the set of view maps. Such generation of the set of view maps may be based on multiple camera views of the 3D object 400 (e.g., stored in the database 115 and accessed therefrom).

In operation 620, for each view map in the accessed set, the color compressor 220 generates a corresponding vector of transform coefficients (e.g., the vector 510 of transform coefficients). As noted above, this may be performed by calculating a mathematical transform of the corresponding view map, and the generated vector specifies a separate transform coefficient for each transform basis function represented in mathematical transform of the corresponding view map.

In operation 630, for each transform basis function represented in the mathematical transform (e.g., for each of the transform basis functions 520), the color compressor 220 generates a corresponding spatial representation of the transform coefficients specified for that transform basis function. In this context, a spatial representation of transform coefficients associated with points in space is a representation of the transform coefficients based on the locations of the points in space. For example, the spatial representation that corresponds to a given transform basis function may be generated based on a spatial transform (e.g., a region-adaptive hierarchical transform (RAHT) or a graph transform (GT)) or based on a spatial prediction. A spatial transform computes linear combinations of the coefficients associated with neighboring points in space, while a spatial prediction computes a difference between a coefficient associated with a point in space and a prediction of the coefficient based on the coefficients associated with its neighbors. Alternative spatial representations of transform coefficients may also be generated. As discussed above, this produces the group 540 of spatial representations of the transform coefficients.

In operation 640, for each transform basis function represented in the mathematical transform (e.g., for each of the transform basis functions 520), the color compressor 220 quantizes the corresponding spatial representation generated in operation 630. As discussed above, this produces a quantized group 550 of spatial representations of the transform coefficients.

In operation 650, the representation provider 230 provides the quantized group 550 of spatial representations to one or more modules or devices (e.g., the device 130) for further processing (e.g., decoding or decompression). For example, the quantized group 550 of spatial representations may be provided to the device 130 via the network 190.

As shown in FIG. 7, in addition to any one or more of the operations previously described with respect to FIG. 6, the method 600 may include one or more of operations 710, 712, 714, 716, 718, 720, 722, 730, 732, 734, 736, and 750. Operation 710 may be performed as part (e.g., a precursor task, a subroutine, or a portion) of operation 610, in which the view map accessor 210 accesses the set of view maps. In operation 710, the view map accessor 210 accesses the set of view maps by accessing a data-uncompressed set of view maps (e.g., the view map 420) that represent the surface light field of the 3D object 400. Furthermore, operation 712 may be performed as part of operation 710. In operation 712, the view map accessor 210 accesses these uncompressed view maps by accessing spherical images whose pixels each have spherical coordinates that specify a corresponding azimuth (e.g., azimuth angle or other azimuth value) and a corresponding elevation (e.g., elevation angle or other elevation value).

In example embodiments that include operation 710, operation 750 may be performed as part of operation 650, in which the representation provider 230 provides a quantized group 550 of spatial representations. In operation 750, the representation provider 230 provides a data-compressed version of the set of view maps accessed in operation 710, and the provision of the data-compressed version is performed by providing the quantized group 550 of spatial representations.

In example embodiments that include operation 712, in which the view map accessor 210 accesses spherical view maps (e.g., the view map 420), operation 716 may be performed between operations 610 and 620. In operation 716, the view map pre-processor 240 modifies this accessed set of view maps by converting each of the spherical images (e.g., the view map 420) to a corresponding cylindrical image (e.g., cylindrical image 430) whose corresponding pixels each have cylindrical coordinates. Moreover, the cylindrical coordinates for each pixel may specify a corresponding azimuth (e.g., azimuth angle or other azimuth value) and a sine (e.g., the trigonometric sine) of the corresponding elevation (e.g., elevation angle or other elevation value). As noted above, this may have the effect of ensuring that equal areas in a spherical image (e.g., the view map 420) are represented as equal areas in the corresponding planar cylindrical image (e.g., the cylindrical image 430), which in turn ensures that any orthogonal features in the spherical image continue to be orthogonal in the corresponding cylindrical image.

As shown in FIG. 7, operation 714 may be performed prior to operation 620 and is illustrated as being performed after operation 610, in which the view map accessor 210 accesses the set of view maps. In operation 714, the view map pre-processor 240 converts multi-component view maps (e.g., RGB view maps or other view maps specifying multiple color components, such as tristimulus color components) to corresponding sets (e.g., triples or trios) of single-component view maps (e.g., three separate view maps for red values, green values, and blue values respectively). In the illustrated example embodiments, the view maps accessed in operation 610 are multi-component view maps, and operation 714 is performed to extract a set of multiple single component view maps from each of the multi-component view maps. Thus, each single-component view map may be or include a single-component spherical image whose pixels each specify a corresponding value for a single image component (e.g., color component, such as a red value, green value, or a blue value).

In some example embodiments, operation 714 includes accessing the multi-component view maps (e.g., RGB view maps), as well as the extracting of the corresponding single-component view maps, and thus operation 714 is performed prior to operation 610, and therein the view map accessor 210 accesses the extracted single-component view maps.

Operation 718 may be performed prior to operation 620, in which the color compressor 220 generates a corresponding vector of transform coefficients (e.g., the vector 510) for each of the view maps. In operation 718, the view map pre-processors 240 subdivides each of the view maps into subregions, thus producing corresponding subdivided images (e.g., the subdivided image 440). As discussed above, each subdivision may have a corresponding color (e.g., to indicate that color information is available for that corresponding set of cylindrical coordinates) or is empty (e.g., to indicate that no color information is available for that corresponding set of cylindrical coordinates).

As shown in FIG. 7, one or more of operations 720 and 722 may be performed as part of operation 620, in which the color compressor 220 generates the vectors of transform coefficients (e.g., the vector 510) by calculating mathematical transforms of the view maps. In operation 720, the color compressor 220 calculates B-spline wavelet transforms of the view maps. In operation 722, the color compressor 220 calculates Karhunen-Loève transforms of the view maps. Other suitable mathematical transforms are applicable and may be similarly used, according to various example embodiments.

As additionally shown in FIG. 7, one or more of operations 730, 732, 734, and 736 may be performed as part of operation 630, in which the color compressor 220 generates the spatial representations of the transform coefficients across the view maps. In operation 730, the color compressor 220 calculates the spatial representations of the transform coefficients by calculating RAHTs of the transform coefficients. That is, the spatial representation of each transform coefficient is generated by calculating the RAHT of the various values of that transform coefficient across the accessed view maps (e.g., across the points on the surface of the 3D object 400).

In operation 732, the color compressor 220 calculates the spatial representations of the transform coefficients based on graph transforms (GT) of the transform coefficients. In other words, the spatial representation of each transform coefficient is generated by calculating the GT of the various values of that transform coefficient across the accessed view maps, with or without further processing to generate the spatial representation of that transform coefficient.

In operation 734, the color compressor 220 calculates the spatial representations of the transform coefficients based on texture map coding (TMC) the transform coefficients. That is, the spatial representation of each transform coefficient is generated by performing TMC on the various values of that transform coefficient across the accessed view maps, with or without further processing to generate the spatial representation of that transform coefficient.

In operation 736, the color compressor 220 calculates the spatial representations of the transform coefficients based on point cloud coding (PCC) the transform coefficients. In other words, the spatial representation of each transform coefficient is generated by performing PCC on the various values of that transform coefficient across the accessed view maps, with or without further processing to generate the spatial representation of that transform coefficient. In PCC, a point cloud codec is used by the color compressor 220 to compress not only positions of the points in a point cloud, but also attributes of the points. By arranging for the attributes of each point to be the transform coefficients of the view map of the point, the attribute compression of the point cloud can be used to generate and compress a spatial representation for each transform coefficient. Two or more of operations 730, 732, 734, and 736 may be used in combination with each other, according to various example embodiments.

Figure 8:
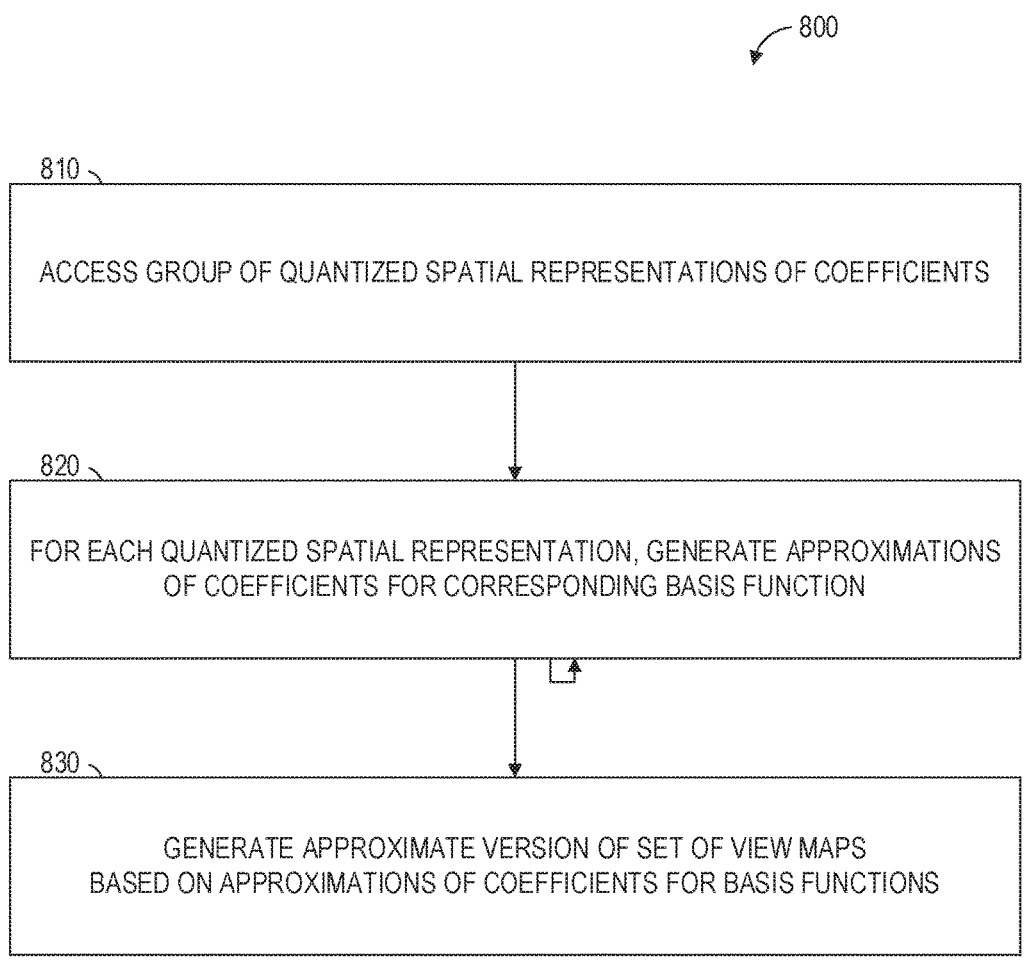
FIG. 8 and FIG. 9 are flowcharts illustrating operations of a device in performing a method of view-dependent color decompression, according to some example embodiments.
Figure 9:
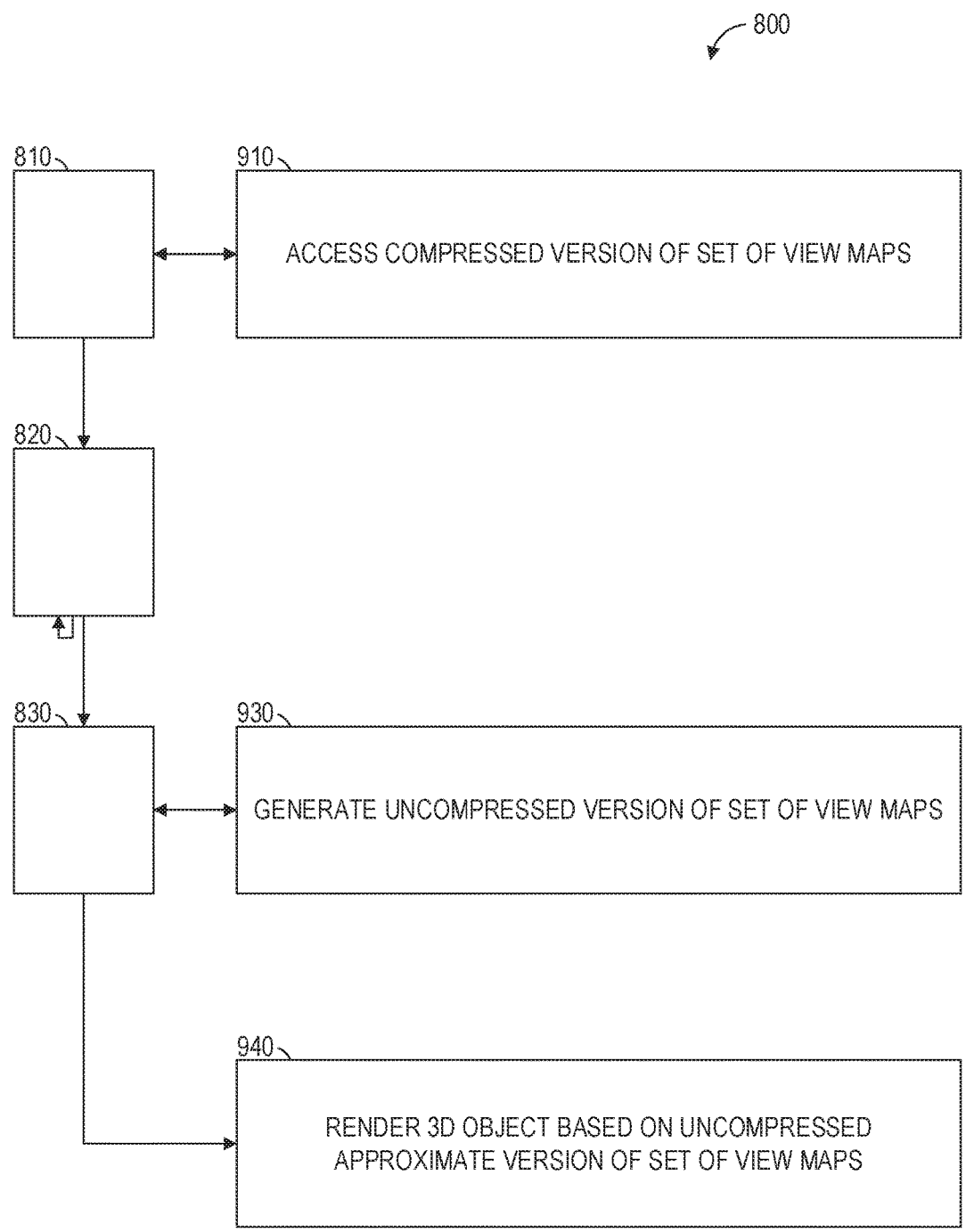

FIG. 8 and FIG. 9 are flowcharts illustrating operations of the device 130 in performing a method 800 of view-dependent color decompression, according to some example embodiments. In some example embodiments, the method 800 is fully or partially performed by a machine (e.g., the compression machine 110) within the network-based system 105. Operations in the method 800 may be performed using components (e.g., modules) described above with respect to FIG. 3, using one or more processors (e.g., microprocessors or other hardware processors), or using any suitable combination thereof. Generally speaking, the method 800 decodes or decompresses the data that was encoded or compressed via the method 600 and may be considered a reverse process to obtain renderable view maps from the output of the method 600. Accordingly, various example details and example features of the method 600 may be suitable or otherwise applicable to the method 800, and for clarity and brevity, are not explicitly repeated in the following discussion of the method 800. As shown in FIG. 8, the method 800 includes operations 810, 820, and 830.

In operation 810, the representation accessor 310 accesses the quantized group 550 of spatial representations, which may be provided in accordance with operation 650 of the method 600. As noted above, the quantized group 550 corresponds to a set of view maps (e.g., the view map 420) that each in turn corresponds to a different point (e.g., the point 401) on the surface of the 3D object 400, and the set of view maps represent the surface light field of the 3D object 400.

In operation 820, for each spatial representation in the quantized group 550, the representation decompressor 320 generates approximations of the transform coefficients for its corresponding transform basis function (e.g., among the transform basis functions 520). That is, the representation decompressor 320 generates approximate values of the corresponding transform coefficient across the various points on the surface of the 3D object 400. As discussed above, for each transform coefficient, these approximations specify various values of that transform coefficient in weighting its corresponding transform basis function (e.g., among the transform basis functions 520).

In operation 830, the representation decompressor 320 generates an approximate version of the set of view maps, based on the approximations generated in operation 820. As noted above, each view map (e.g., the view map 420) corresponds to a different point (e.g., the point 401) on the surface of the 3D object 400. Moreover, when approximated in operation 830, the set of view maps may be in spherical format (e.g., like the view map 420) or cylindrical format (e.g., like the cylindrical image 430), or may be subdivided into subregions (e.g., like the subdivided image 440).

As shown in FIG. 9, in addition to any one or more of the operations previously described with respect to FIG. 8, the method 800 may include one or more of operations 910, 930, and 940. Operation 910 may be performed as part of operation 810, in which the representation accessor 310 accesses the quantized group 550 of spatial representations. In operation 910, the representation accessor 310 accesses data-compressed version of the set of view maps (e.g., the view map 420) that represents the surface light field of the 3D object 400, and this is performed by accessing the quantized group 550 spatial representations (e.g., via the network 190, via retrieval from the database 115, via communication from the compression machine 110, via communication from the device 150, or any suitable combination thereof).

In example embodiments that include operation 910, operation 930 may be performed as part of operation 830, in which the representation decompressor 320 generates the approximate version of the set of view maps. In operation 930, the representation decompressor 320 generates a data-uncompressed version of the set of view maps, and this is performed by generating the approximate version of the set of view maps.

As also shown in FIG. 9, operation 940 may be performed after operation 830 (e.g., after operation 930). In operation 940, the rendering engine 330 causes the 3D object 400 to be rendered based on the approximate version of the set of view maps. This may be performed by determining a particular point of view (e.g., one of the points of view 411, 412, and 413) and rendering the 3D object 400 therefrom (e.g., from the point of view 411) based on the approximate version of the set of view maps, or otherwise initiating the rendering of the 3D object 400 from the determined point of view (e.g., the point of view 411) based on the approximate version of the set of view maps.

According to various example embodiments, one or more of the methodologies described herein may facilitate encoding or compression of color information, decoding or decompression of color information, or any suitable combination thereof. Moreover, one or more of the methodologies described herein may facilitate compression, processing, communication, storage, decompression, rendering, and enjoyment of view-dependent color information (e.g., in the form of a set of view maps). Hence, one or more of the methodologies described herein may facilitate rendering a scene (e.g., including one or more 3D objects, such as a three object 400) from any arbitrary viewpoint, as well as facilitate high-performance and efficient communication of such a scene across one or more data networks, compared to capabilities of pre-existing systems and methods.

When these effects are considered in aggregate, one or more of the methodologies described herein may obviate a need for certain efforts or resources that otherwise would be involved in obtaining these technical benefits. Efforts expended by a user in encoding, compressing, decoding, decompressing, communicating, or otherwise processing view-dependent color information may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
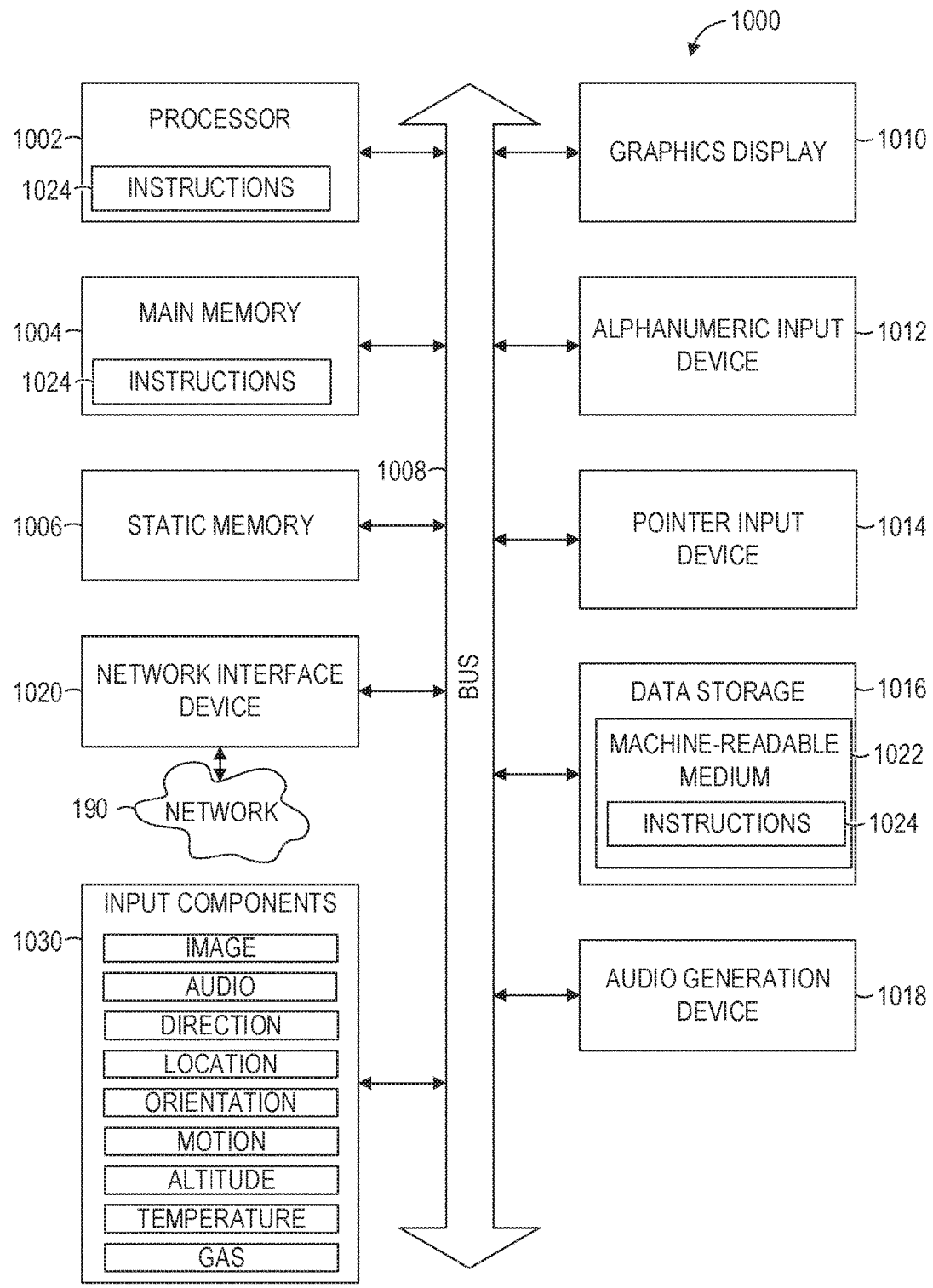
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device), and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1030 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1024 for execution by the machine 1000 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore. unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:
accessing, by one or more processors of a machine, a set of view maps that each corresponds to a different surface point on a surface of a three-dimensional (3D) object, the set of view maps representing a surface light field of the 3D object;
for each view map in the set, and by one or more processors of the machine, generating a corresponding vector of transform coefficients by calculating a transform of the view map, the generated vector specifying a separate transform coefficient for each transform basis function among a plurality of transform basis functions represented in the transform of the view map;
for each transform basis function in the plurality, and by one or more processors of the machine:
    generating a spatial representation of transform coefficients specified for that transform basis function by the generated vectors of transform coefficients of all view maps in the set that represents the surface light field of the 3D object; and quantizing the generated spatial representation of transform coefficients for that transform basis function, the quantized spatial representation forming part of a group of quantized spatial representations of transform coefficients that corresponds to the accessed set of view maps; and providing, by one or more processors of the machine, the group of quantized spatial representations of transform coefficients. Thus, the machine in this example may be considered as an encoder, compressor, or both.

A second example provides a method according to the first example, wherein:

for each view map in the set, the transform calculated in the generating of the corresponding vector of transform coefficients includes a B-spline wavelet transform; and for each view map in the set, the generated vector of transform coefficients specifies a separate transform coefficient for each B-spline wavelet basis function among a plurality of B-spline wavelet basis functions represented in the B-spline wavelet transform of the view map.

A third example provides a method according to the first example or the second example, wherein:

for each view map in the set, the transform calculated in the generating of the corresponding vector of transform coefficients includes a Karhunen-Loève transform (KLT); and for each view map in the set, the generated vector of transform coefficients specifies a separate transform coefficient for each Karhunen-Loève basis function among a plurality of Karhunen-Loève basis functions represented in the Karhunen-Loève transform of the view map.

A fourth example provides a method according to any of the first through third examples, wherein:

the accessing of the set of view maps accesses a data-uncompressed set of view maps that represents the surface light field of the 3D object; and the providing of the group of quantized spatial representations of transform coefficients provides a data-compressed version of the set of view maps that represents the surface light field of the 3D object.

A fifth example provides a method according to any of the first through fourth examples, wherein:

the accessing of the set of view maps accesses spherical images whose pixels each have spherical coordinates that specify a corresponding azimuth and a corresponding elevation;

the method further comprises:

modifying the set of view maps by converting each of the spherical images to a corresponding cylindrical image whose corresponding pixels each have cylindrical coordinates that specify the corresponding azimuth and a sine of the corresponding elevation; and wherein:

for each view map in the set, the generating of the corresponding vector of transform coefficients calculates the transform of the modified view map.

A sixth example provides a method according to any of the first through fifth examples, wherein:

for each transform basis function in the plurality, the generating of the spatial representation of transform coefficients is based on a spatial transform of the transform coefficients specified for that transform basis function by the generated vectors of transform coefficients.

A seventh example provides a method according to the sixth example, wherein:

for each transform basis function in the plurality, the generating of the spatial representation of transform coefficients specified for that transform basis function is based on a region-adaptive hierarchical transform (RAHT).

An eighth example provides a method according to the sixth example or the seventh example, wherein:

for each transform basis function in the plurality, the generating of the spatial representation of transform coefficients specified for that transform basis function is based on a graph transform (GT).

A ninth example provides a method according to any of the sixth through eighth examples, wherein:

for each transform basis function in the plurality, the generating of the spatial representation of transform coefficients specified for that transform basis function is based on texture map coding (TMC).

A tenth example provides a method according to any of the sixth through ninth examples, wherein:

for each transform basis function in the plurality, the generating of the spatial representation of transform coefficients specified for that transform basis function is based on point cloud coding (PCC).

An eleventh example provides a method according to any of the first through tenth examples, wherein:

the accessing of the set of view maps includes generating the set of view maps based on multiple camera views of the 3D model.

A twelfth example provides a method according to any of the first through eleventh examples, further comprising:

accessing multi-component view maps that each include a corresponding multi-component spherical image whose pixels each specify corresponding values for multiple image components; and extracting multiple single-component view maps from each of the multi-component view maps, each single-component view map including a single-component spherical image whose pixels each specify a corresponding value for a single image component; wherein:

the accessing of the set of view maps accesses the extracted single-component spherical images; and for each view map in the set, the generating of the corresponding vector of transform coefficients calculates the transform of a corresponding single-component spherical image. This may have the effect of separately processing each color component among multiple color components (e.g., separate processing of each tristimulus color component, such as red, green, and blue).

A thirteenth example provides a method according to any of the first through twelfth examples, further comprising:

for each view map in the set, subdividing the view map into subregions that each indicate presence or absence of a corresponding indicator of the surface light field of the 3D object; and wherein:

for each view map in the set, the generating of the corresponding vector of transform coefficients calculates the transform of the subregions that each indicate presence or absence of the corresponding indicator of the surface light field. In some variants of the thirteenth example, each view map is subdivided into subregions of equal area.

A fourteenth example provides a method comprising:

accessing, by one or more processors of a machine, a group of quantized spatial representations of transform coefficients, the group corresponding to a set of view maps that each corresponds to a different surface point on a surface of a three-dimensional (3D) object, the set of view maps representing a surface light field of the 3D object;

for each quantized spatial representation in the group, and by one or more processors of the machine, generating approximations of transform coefficients for a corresponding transform basis function among a plurality of transform basis functions represented in a transform of a corresponding view map among the set of view maps, the generated approximations specifying transform coefficients for that transform basis function in vectors of transform coefficients resultant from transforms of all view maps in the set, and generating, by one or more processors of the machine, an approximate version of the set of view maps to represent the surface light field of the 3D object, the approximate version being generated based on the approximations of transform coefficients generated for each quantized spatial representation in the group. Thus, the machine in this example may be considered as a decoder, decompressor, or both.

A fifteenth example provides a method according to the fourteenth example, wherein:

the transform includes a B-spline wavelet transform; and for each quantized spatial representation in the group, the generated approximations specify B-spline wavelet coefficients for a corresponding B-spline wavelet basis function in vectors of B-spline wavelet coefficients resultant from B-spline wavelet transforms of all view maps in the set of view maps.

A sixteenth example provides a method according to the fifteenth example or the fourteenth example, wherein:

the accessing of the group of quantized spatial representations of transform coefficients accesses a data-compressed version of the set of view maps that represents the surface light field of the 3D object; and the generating of the approximate version of the set of view maps generates a data-uncompressed version of the set of view maps that represents the surface light field of the 3D object.

A seventeenth example provides a machine-readable medium (e.g., a non-transitory machine-readable storage medium) comprising instructions that, when executed by one or more processors of a machine, cause the machine to perform operations comprising:

accessing a set of view maps that each corresponds to a different surface point on a surface of a three-dimensional (3D) object, the set of view maps representing a surface light field of the 3D object;

for each view map in the set, generating a corresponding vector of transform coefficients by calculating a transform of the view map, the generated vector specifying a separate transform coefficient for each transform basis function among a plurality of transform basis functions represented in the transform of the view map;

for each transform basis function in the plurality:
    generating a spatial representation of transform coefficients specified for that transform basis function by the generated vectors of transform coefficients of all view maps in the set that represents the surface light field of the 3D object; and
    quantizing the generated spatial representation of transform coefficients for that transform basis function, the quantized spatial representation forming part of a group of quantized spatial representations of transform coefficients that corresponds to the accessed set of view maps; and providing the group of quantized spatial representations of transform coefficients. Thus, the machine in this example may be considered as an encoder, compressor, or both.

An eighteenth example provides a machine-readable medium (e.g., a non-transitory machine-readable storage medium) comprising instructions that, when executed by one or more processors of a machine, cause the machine to perform operations comprising:

accessing a group of quantized spatial representations of transform coefficients, the group corresponding to a set of view maps that each corresponds to a different surface point on a surface of a three-dimensional (3D) object, the set of view maps representing a surface light field of the 3D object;

for each quantized spatial representation in the group, generating approximations of transform coefficients for a corresponding transform basis function among a plurality of transform basis functions represented in a transform of a corresponding view map among the set of view maps, the generated approximations specifying transform coefficients for that transform basis function in vectors of transform coefficients resultant from transforms of all view maps in the set; and generating an approximate version of the set of view maps to represent the surface light field of the 3D object, the approximate version being generated based on the approximations of transform coefficients generated for each quantized spatial representation in the group. Thus, the machine in this example may be considered as a decoder, decompressor, or both.

A nineteenth example provides a system (e.g., a computer system) comprising:

one or more processors; and a memory storing instructions that, when executed by at least one processor among the one or more processors, cause the system to perform operations comprising:

accessing a set of view maps that each corresponds to a different surface point on a surface of a three-dimensional (3D) object, the set of view maps representing a surface light field of the 3D object;

for each view map in the set, generating a corresponding vector of transform coefficients by calculating a transform of the view map, the generated vector specifying a separate transform coefficient for each transform basis function among a plurality of transform basis functions represented in the transform of the view map;

for each transform basis function in the plurality:
    generating a spatial representation of transform coefficients specified for that transform basis function by the generated vectors of transform coefficients of all view maps in the set that represents the surface light field of the 3D object; and
    quantizing the generated spatial representation of transform coefficients for that transform basis function, the quantized spatial representation forming part of a group of quantized spatial representations of transform coefficients that corresponds to the accessed set of view maps; and providing the group of quantized spatial representations of transform coefficients. Thus, the system in this example may be considered as an encoder, compressor, or both.

A twentieth example provides a system (e.g., a computer system) comprising:

one or more processors; and a memory storing instructions that, when executed by at least one processor among the one or more processors, cause the system to perform operations comprising:

accessing a group of quantized spatial representations of transform coefficients, the group corresponding to a set of view maps that each corresponds to a different surface point on a surface of a three-dimensional (3D) object, the set of view maps representing a surface light field of the 3D object;

for each quantized spatial representation in the group, generating approximations of transform coefficients for a corresponding transform basis function among a plurality of transform basis functions represented in a transform of a corresponding view map among the set of view maps, the generated approximations specifying transform coefficients for that transform basis function in vectors of transform coefficients resultant from transforms of all view maps in the set; and generating an approximate version of the set of view maps to represent the surface light field of the 3D object, the approximate version being generated based on the approximations of transform coefficients generated for each quantized spatial representation in the group. Thus, the system in this example may be considered as a decoder, decompressor, or both.

A twenty-first example provides a carrier medium carrying machine-readable instructions for controlling a machine to carry out the operations (e.g., method operations) performed in any one of the previously described examples.

What is claimed is:

1. A method comprising:
accessing, by one or more processors of a machine, a set of view maps that each corresponds to a different surface point on a surface of a three-dimensional (3D) object, the set of view maps representing a surface light field of the 3D object;
for each view map in the set, and by one or more processors of the machine, generating a corresponding vector of transform coefficients by calculating a transform of the view map, the generated vector specifying a separate transform coefficient for each transform basis function among a plurality of transform basis functions represented in the transform of the view map;
for each transform basis function in the plurality, and by one or more processors of the machine:
generating a spatial representation of transform coefficients specified for that transform basis function by the generated vectors of transform coefficients of all view maps in the set that represents the surface light field of the 3D object; and
quantizing the generated spatial representation of transform coefficients for that transform basis function, the quantized spatial representation forming part of a group of quantized spatial representations of transform coefficients that corresponds to the accessed set of view maps; and
providing, by one or more processors of the machine, the group of quantized spatial representations of transform coefficients.

2. The method of claim 1, wherein:
for each view map in the set, the transform calculated in the generating of the corresponding vector of transform coefficients includes a B-spline wavelet transform; and
for each view map in the set, the generated vector of transform coefficients specifies a separate transform coefficient for each B-spline wavelet basis function among a plurality of B-spline wavelet basis functions represented in the B-spline wavelet transform of the view map.

3. The method of claim 1, wherein:
for each view map in the set, the transform calculated in the generating of the corresponding vector of transform coefficients includes a Karhunen-Loève transform (KLT); and
for each view map in the set, the generated vector of transform coefficients specifies a separate transform coefficient for each Karhunen-Loève basis function among a plurality of Karhunen-Loève basis functions represented in the Karhunen-Loève transform of the view map.

4. The method of claim 1, wherein:
the accessing of the set of view maps accesses a data-uncompressed set of view maps that represents the surface light field of the 3D object; and
the providing of the group of quantized spatial representations of transform coefficients provides a data-compressed version of the set of view maps that represents the surface light field of the 3D object.

5. The method of claim 1, wherein:
the accessing of the set of view maps accesses spherical images whose pixels each have spherical coordinates that specify a corresponding azimuth and a corresponding elevation;
the method further comprises:
modifying the set of view maps by converting each of the spherical images to a corresponding cylindrical image whose corresponding pixels each have cylindrical coordinates that specify the corresponding azimuth and a sine of the corresponding elevation; and wherein:
for each view map in the set, the generating of the corresponding vector of transform coefficients calculates the transform of the modified view map.

6. The method of claim 1, wherein:
for each transform basis function in the plurality, the generating of the spatial representation of transform coefficients is based on a spatial transform of the transform coefficients specified for that transform basis function by the generated vectors of transform coefficients.

7. The method of claim 1, wherein:
for each transform basis function in the plurality, the generating of the spatial representation of transform coefficients specified for that transform basis function is based on a region-adaptive hierarchical transform (RAHT).

8. The method of claim 1, wherein:
for each transform basis function in the plurality, the generating of the spatial representation of transform coefficients specified for that transform basis function is based on a graph transform (GT).

9. The method of claim 1, wherein:
for each transform basis function in the plurality, the generating of the spatial representation of transform coefficients specified for that transform basis function is based on texture map coding (TMC).

10. The method of claim 1, wherein:
for each transform basis function in the plurality, the generating of the spatial representation of transform coefficients specified for that transform basis function is based on point cloud coding (PCC).

11. The method of claim 1, wherein:
the accessing of the set of view maps includes generating the set of view maps based on multiple camera views of the 3D model.

12. The method of claim 1, further comprising:
accessing multi-component view maps that each include a corresponding multi-component spherical image whose pixels each specify corresponding values for multiple image components; and
extracting multiple single-component view maps from each of the multi-component view maps, each single-component view map including a single-component spherical image whose pixels each specify a corresponding value for a single image component; wherein:
the accessing of the set of view maps accesses the extracted single-component spherical images; and for each view map in the set, the generating of the corresponding vector of transform coefficients calculates the transform of a corresponding single-component spherical image.

13. The method of claim 1, further comprising:
for each view map in the set, subdividing the view map into subregions that each indicate presence or absence of a corresponding indicator of the surface light field of the 3D object; and wherein:
for each view map in the set, the generating of the corresponding vector of transform coefficients calculates the transform of the subregions that each indicate presence or absence of the corresponding indicator of the surface light field.

14. A method comprising:
accessing, by one or more processors of a machine, a group of quantized spatial representations of transform coefficients, the group corresponding to a set of view maps that each corresponds to a different surface point on a surface of a three-dimensional (3D) object, the set of view maps representing a surface light field of the 3D object;
for each quantized spatial representation in the group, and by one or more processors of the machine, generating approximations of transform coefficients for a corresponding transform basis function among a plurality of transform basis functions represented in a transform of a corresponding view map among the set of view maps, the generated approximations specifying transform coefficients for that transform basis function in vectors of transform coefficients resultant from transforms of all view maps in the set; and
generating, by one or more processors of the machine, an approximate version of the set of view maps to represent the surface light field of the 3D object, the approximate version being generated based on the approximations of transform coefficients generated for each quantized spatial representation in the group.

15. The method of claim 14, wherein:
the transform includes a B-spline wavelet transform; and
for each quantized spatial representation in the group, the generated approximations specify B-spline wavelet coefficients for a corresponding B-spline wavelet basis function in vectors of B-spline wavelet coefficients resultant from B-spline wavelet transforms of all view maps in the set of view maps.

16. The method of claim 14, wherein:
the accessing of the group of quantized spatial representations of transform coefficients accesses a data-compressed version of the set of view maps that represents the surface light field of the 3D object; and
the generating of the approximate version of the set of view maps generates a data-uncompressed version of the set of view maps that represents the surface light field of the 3D object.

17. A non-transitory machine-readable storage medium comprising instructions that, when executed by one or more processors of a machine, cause the machine to perform operations comprising:
accessing a set of view maps that each corresponds to a different surface point on a surface of a three-dimensional (3D) object, the set of view maps representing a surface light field of the 3D object;
for each view map in the set, generating a corresponding vector of transform coefficients by calculating a transform of the view map, the generated vector specifying a separate transform coefficient for each transform basis function among a plurality of transform basis functions represented in the transform of the view map;
for each transform basis function in the plurality:
generating a spatial representation of transform coefficients specified for that transform basis function by the generated vectors of transform coefficients of all view maps in the set that represents the surface light field of the 3D object; and
quantizing the generated spatial representation of transform coefficients for that transform basis function, the quantized spatial representation forming part of a group of quantized spatial representations of transform coefficients that corresponds to the accessed set of view maps; and
providing the group of quantized spatial representations of transform coefficients.

18. A non-transitory machine-readable storage medium comprising instructions that, when executed by one or more processors of a machine, cause the machine to perform operations comprising:
accessing a group of quantized spatial representations of transform coefficients, the group corresponding to a set of view maps that each corresponds to a different surface point on a surface of a three-dimensional (3D) object, the set of view maps representing a surface light field of the 3D object;
for each quantized spatial representation in the group, generating approximations of transform coefficients for a corresponding transform basis function among a plurality of transform basis functions represented in a transform of a corresponding view map among the set of view maps, the generated approximations specifying transform coefficients for that transform basis function in vectors of transform coefficients resultant from transforms of all view maps in the set; and
generating an approximate version of the set of view maps to represent the surface light field of the 3D object, the approximate version being generated based on the approximations of transform coefficients generated for each quantized spatial representation in the group.

19. A system comprising:
one or more processors; and
a memory storing instructions that, when executed by at least one processor among the one or more processors, cause the system to perform operations comprising:
accessing a set of view maps that each corresponds to a different surface point on a surface of a three-dimensional (3D) object, the set of view maps representing a surface light field of the 3D object;
for each view map in the set, generating a corresponding vector of transform coefficients by calculating a transform of the view map, the generated vector specifying a separate transform coefficient for each transform basis function among a plurality of transform basis functions represented in the transform of the view map;
for each transform basis function in the plurality:
generating a spatial representation of transform coefficients specified for that transform basis function by the generated vectors of transform coefficients of all view maps in the set that represents the surface light field of the 3D object; and
quantizing the generated spatial representation of transform coefficients for that transform basis function, the quantized spatial representation forming part of a group of quantized spatial representations of transform coefficients that corresponds to the accessed set of view maps; and providing the group of quantized spatial representations of transform coefficients.

20. A system comprising:

one or more processors; and a memory storing instructions that, when executed by at least one processor among the one or more processors, cause the system to perform operations comprising:

accessing a group of quantized spatial representations of transform coefficients, the group corresponding to a set of view maps that each corresponds to a different surface point on a surface of a three-dimensional (3D) object, the set of view maps representing a surface light field of the 3D object;

for each quantized spatial representation in the group, generating approximations of transform coefficients for a corresponding transform basis function among a plurality of transform basis functions represented in a transform of a corresponding view map among the set of view maps, the generated approximations specifying transform coefficients for that transform basis function in vectors of transform coefficients resultant from transforms of all view maps in the set; and generating an approximate version of the set of view maps to represent the surface light field of the 3D object, the approximate version being generated based on the approximations of transform coefficients generated for each quantized spatial representation in the group.

* * * * *

UNITED STATES PATENT AND TRADEMARK OFFICE
CERTIFICATE OF CORRECTION

PATENT NO. : 10,262,451 B1
APPLICATION NO. : 15/948655
DATED : April 16, 2019
INVENTOR(S) : Chou et al.

It is certified that error appears in the above-identified patent and that said Letters Patent is hereby corrected as shown below:

On the Title Page

On page 2, in Column 1, item (56) under "Other Publications", Line 42, delete "with with" and insert --with-- therefor On page 2, in Column 2, item (56) under "Other Publications", Line 58, delete "Ef?ciency" and insert --Efficiency-- therefor On page 2, in Column 2, item (56) under "Other Publications", Line 67, delete "Tansform"," and insert --Transform",-- therefor In the Specification In Column 3, Line 34, delete "115." and insert --115,-- therefor In Column 10, Line 47, delete "430)." and insert --430),-- therefor In Column 18, Line 39, delete "Furthermore." and insert --Furthermore,-- therefor In Column 18, Line 53, after "object;", insert --¶--

In Column 21, Line 4, delete "set," and insert --set;-- therefor

In Column 22, Line 3, after "object;", insert --¶--

In Column 22, Line 61, after "object;", insert --¶--

Signed and Sealed this
Eighth Day of December, 2020

Andrei Iancu
*Director of the United States Patent and Trademark Office*